United States Patent
Chen et al.

(10) Patent No.: US 11,948,465 B2
(45) Date of Patent: Apr. 2, 2024

(54) CONTROL METHOD, DEVICE, AND SYSTEM FOR LOCKING LOAD CARRIED BY FLIGHT PLATFORM

(71) Applicant: SZ DJI TECHNOLOGY CO., LTD., Shenzhen (CN)

(72) Inventors: Hanping Chen, Shenzhen (CN); Yong Yang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 719 days.

(21) Appl. No.: 17/029,942

(22) Filed: Sep. 23, 2020

(65) Prior Publication Data
US 2021/0005092 A1    Jan. 7, 2021

Related U.S. Application Data

(63) Continuation of application No. PCT/CN2018/080167, filed on Mar. 23, 2018.

(51) Int. Cl.
*G08G 5/00* (2006.01)
*B64D 9/00* (2006.01)

(52) U.S. Cl.
CPC ............ *G08G 5/0021* (2013.01); *B64D 9/00* (2013.01); *G08G 5/0004* (2013.01)

(58) Field of Classification Search
CPC .. G08G 5/0021; G08G 5/0004; G08G 5/0013; G08G 5/0026; G08G 5/0069; B64D 9/00; B64C 39/024; B64U 2101/60; G05B 19/048
See application file for complete search history.

(56) References Cited

U.S. PATENT DOCUMENTS

| | | | |
|---|---|---|---|
| 10,254,767 B1* | 4/2019 | Kamon | G06V 20/13 |
| 2006/0178146 A1* | 8/2006 | Lee | H04W 8/04 |
| | | | 455/435.1 |
| 2012/0091204 A1 | 4/2012 | Shi | |
| 2016/0373699 A1* | 12/2016 | Torres | G05D 1/0094 |
| 2017/0253330 A1 | 9/2017 | Saigh et al. | |
| 2018/0025649 A1* | 1/2018 | Contreras | G08G 5/0069 |
| | | | 701/3 |
| 2018/0103036 A1* | 4/2018 | Fox | H04W 4/40 |

FOREIGN PATENT DOCUMENTS

| | | |
|---|---|---|
| CN | 203086183 U | 7/2013 |
| CN | 103426282 A | 12/2013 |
| CN | 103630119 A | 3/2014 |

(Continued)

OTHER PUBLICATIONS

English translation of CN-107004173-A (Year: 2017).*

(Continued)

*Primary Examiner* — Shon G Foley
(74) *Attorney, Agent, or Firm* — ANOVA LAW GROUP, PLLC

(57) ABSTRACT

A control method includes obtaining lock information including a flight platform identification and sending a lock message to a control device according to the lock information. The control device includes a flight platform corresponding to the flight platform identification or an adapter ring carried by the flight platform. The lock message indicates to lock a load carried by and communicatively connected to the flight platform.

22 Claims, 4 Drawing Sheets

(56) References Cited

FOREIGN PATENT DOCUMENTS

| | | | |
|---|---|---|---|
| CN | 104007766 A | 8/2014 | |
| CN | 105120146 A | 12/2015 | |
| CN | 105190639 A | 12/2015 | |
| CN | 105989612 A | 10/2016 | |
| CN | 205862593 U | 1/2017 | |
| CN | 106462160 A | 2/2017 | |
| CN | 106605180 A | 4/2017 | |
| CN | 106850728 A | 6/2017 | |
| CN | 107004173 A * | 8/2017 | ........... A47G 29/141 |
| CN | 107004344 A | 8/2017 | |
| CN | 107284661 A | 10/2017 | |
| CN | 107357316 A | 11/2017 | |
| CN | 107783470 A | 3/2018 | |
| WO | 2015132822 A1 | 9/2015 | |

OTHER PUBLICATIONS

The World Intellectual Property Organization (WIPO) International Search Report for PCT/CN2018/080167 dated Nov. 23, 2018 5 Pages (including translation).

Jie Chen et al. "Design and Realization of ARM-based Fly Task Control System in UAV, Guided by Small TV with the Ability of Attacking and Scouting", Science & Technology Review, vol. 31, No. 1, pp. 27-32, 2013.

* cited by examiner

CONTROL METHOD, DEVICE, AND SYSTEM FOR LOCKING LOAD CARRIED BY FLIGHT PLATFORM

CROSS-REFERENCE TO RELATED APPLICATION

This application is a continuation of International Application No. PCT/CN2018/080167, filed Mar. 23, 2018, the entire content of which is incorporated herein by reference.

TECHNICAL FIELD

The present disclosure generally relates to the flight technology field and, more particularly, to a control method, device, and system.

BACKGROUND

With the continuous development of flight technology, flight platform is more and more widely applied.

In the existing technology, to improve an application range of the flight platform, a user may provide different loads at the flight platform as needed. For example, a third-party developer may develop a load based on a platform software development kit (PSDK) of the flight platform. The developed load may communicate with the flight platform through a PSDK interface. When the load is carried by the flight platform, the user may control the load as needed when the flight platform is flying.

However, in the existing technology, the safety of the load cannot be guaranteed. For example, the third-party developer may develop some illegal loads based on the PSDK of the flight platform. However, such illegal loads carried by the flight platform may not be controlled by the manufacturer.

SUMMARY

Embodiments of the present disclosure provide a control method. The method includes obtaining lock information including a flight platform identification and sending a lock message to a control device according to the lock information. The control device includes a flight platform corresponding to the flight platform identification or an adapter ring carried by the flight platform. The lock message is used to indicates to lock a load. The load is carried by the flight platform and communicatively connected to the flight platform.

Embodiments of the present disclosure provide a control method. The method includes receiving a lock message sent by a server and locking the load according to the lock message. The lock information indicates to lock a load carried by and communicatively connected to a flight platform.

Embodiments of the present disclosure provide a server including a processor. The processor is configured to obtain lock information including a flight platform identification and send the lock message to a control device according to the lock information. The control device includes a flight platform corresponding to the flight platform identification or an adapter ring carried by the flight platform. The lock message indicates to lock a load carried by and communicatively connected to the flight platform.

DETAILED DESCRIPTION OF THE EMBODIMENTS

To make purposes, technical solutions, and advantages of the present disclosure clearer, the technical solutions in embodiments of the present disclosure are described in conjunction with accompanying drawings in embodiments of the present disclosure. The described embodiments are only some embodiments not all the embodiments of the present disclosure. Based on the embodiments of the disclosure, all other embodiments obtained by those of ordinary skill in the art without any creative work are within the scope of the present disclosure.

Figure 1A:
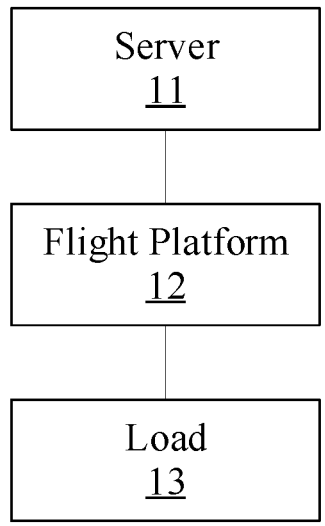
FIG. 1A is a schematic diagram showing an application architecture of a control method according to some embodiments of the present disclosure.

FIG. 1A is a schematic diagram showing an application architecture of a control method according to some embodiments of the present disclosure. As shown in FIG. 1A, the application architecture of the method includes a server 11, a flight platform 12, and a load 13. The load 13 is carried by the flight platform 12. The server 11 is communicatively connected to the flight platform 12. The flight platform 12 is communicatively connected to the load 13. The server 11 may send a lock message to the flight platform 12. The flight platform 12 may lock the load 13 according to the lock message sent by the server 11. A purpose of locking the load 13 may include preventing a user from controlling the load 13 through the flight platform 12. As such, the load 13 may not complete a task specified by the user.

In some embodiments, the flight platform 12 may include an unmanned aerial vehicle (UAV). The load 13 may include a camera, a laser transmitter, etc.

In some embodiments, the flight platform 12 may control a communication link and/or power source of the load 13. Correspondingly, locking the load 13 may include cutting off the power source of the load 13, and/or cutting off the communication link of the load 13.

Figure 1B:
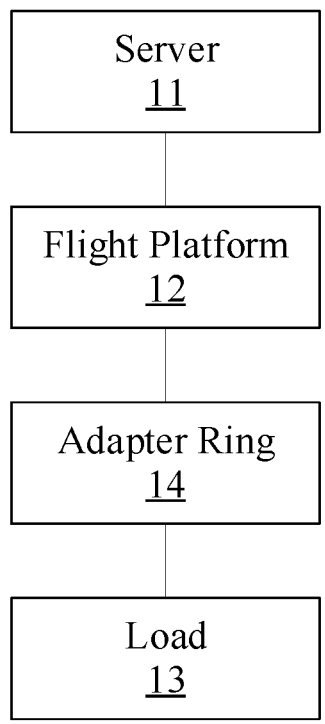
FIG. 1B is a schematic diagram for another application architecture of the control method according to some embodiments of the present disclosure.

In some embodiments, an adapter ring carried by the flight platform 12 may be configured to control the communication link and/or power source of the load 13. Correspondingly, an application architecture of the method is shown in FIG. 1B. As shown in FIG. 1B, the application architecture of the method includes the server 11, the flight platform 12, the load 13, and an adapter ring 14. Both the load 13 and the adapter ring 14 are carried by the flight platform 12. The server 11 is communicatively connected to the adapter ring 14. The flight platform 12 is communicatively connected to the load 13. The server 11 may send a lock message to the adapter ring 14. The adapter ring 14 may lock the load 13 according to the lock message sent by the server 11. Optionally, the adapter ring 14 may be communicatively connected to the server 11 through the flight platform 12. The adapter ring 14 may be communicatively connected to the load 13. The flight platform 12 may be communicatively connected to the load 13 through the adapter ring 14. For example, in FIG. 1B, the adapter ring 14 is communicatively connected to the server 11 through the flight platform 12, and the flight platform 12 is communicatively connected to the load 13 through the adapter ring 14.

The flight platform 12 in the architecture of FIG. 1A, or the flight platform 12 or the adapter ring 14 in the architecture of FIG. 1B can be considered as the control device described below.

The communicative connection may include a direct communicative connection or an indirect communicative connection, which is not limited by the present disclosure. For example, the server 11 may be communicatively connected to the flight platform 12 through a remote controller.

The load 13 may include a load of the flight platform itself, or a load developed by a third-party developer, which is not limited by the present disclosure.

If the load 13 is developed by the third-party developer, a communication protocol used by the load 13 may be a PSDK communication protocol provided by the flight platform 12. A communication protocol used by the flight platform 12 may be a non-PSDK communication protocol. Therefore, the control of the communication link of the load 13 by the flight platform 12 or the adapter ring 14 can be understood as the conversion of the communication protocol.

One or more loads 13 may be included. The loads 13 may include all or some of the loads carried by the flight platform 12, which are not limited by the present disclosure. If one load 13 is included, the load 13 may be considered as a load having a safety issue. If a plurality of loads 13 are included, all or some of the loads 13 may be considered as the loads having safety issues.

Figure 2:
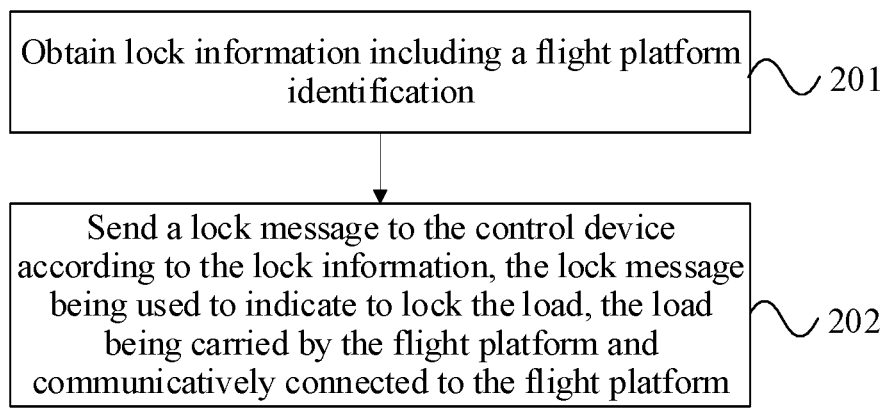
FIG. 2 is a schematic flowchart of the control method according to some embodiments of the present disclosure.

FIG. 2 is a schematic flowchart of the control method according to some embodiments of the present disclosure. As shown in FIG. 2, the method includes the following processes.

At 201, lock information is obtained, which includes a flight platform identification.

In the process, the lock information includes the flight platform identification, and is used to indicate that the load carried by a specific flight platform corresponding to the flight platform identification needs to be locked. The present disclosure does not limit a manner for the server to obtain the lock information. In some embodiments, the server may obtain the lock information by obtaining the lock information entered by a user, or by obtaining a coordinate of the flight platform entered by the user and determining the lock information according to the coordinate of the flight platform, or by receiving the lock information sent by another device. Since the server may obtain a coordinate of each of the different flight platforms, the flight platform identification may be determined according to the coordinate of the flight platform (i.e., the flight platform coordinate).

The present disclosure does not limit a manner of how to determine that the load of the specific flight platform needs to be locked. For example, when a flight platform flies over a school, and a laser transmitter carried by the flight platform transmits a red laser, since the laser may harm a human body, the user may report the flight platform coordinate. Further, the flight platform identification may be determined according to the flight platform coordinate, so as to determine that the load of the flight platform needs to be locked.

At 202, a lock message is sent to the control device according to the lock information, the lock message is used to indicate to lock the load. The load is carried by the flight platform and is communicatively connected to the flight platform.

In some embodiments, the control device may include the flight platform or the adapter ring carried by the flight platform. A manner of sending the lock message to the control device according to the lock information is not limited by the present disclosure. In some embodiments, the lock message may be generated according to the lock information, and may be sent to the control device. In some other embodiments, the lock message corresponding to the lock information may be determined according to the lock information and correspondences between lock information and lock messages, and may be sent to the control device.

A manner for the lock message to indicate to lock the load is not limited by the present disclosure. For example, the lock message may indicate to lock the load through a message name, or a specific identification (e.g., 1) of the message.

A manner for the server to send the lock message to the control device is not limited by the present disclosure. In some embodiments, the server may directly send the lock message to the control device without an intermediate device. For example, the control device may include a receiver. The server may include a transmitter. The lock message sent by the server through the transmitter may be directly received by the control device through the receiver. In some other embodiments, the server may send the lock message to the control device through the intermediate device (e.g., a relay device, a remote controller, etc.).

In some embodiments, the lock message may be sent to the control device according to the lock information containing the flight platform identification. The lock message is used to indicate to lock the load carried by the flight platform. Thus, the server may lock the load carried by the flight platform through the control device, such that the user may not control the load through the flight platform, and the load may not complete the task specified by the user. As such, the user may be prevented from using the load having safety issues, and a problem of unsecured safety of the load may be solved. For example, the third-party developer may develop some illegal loads based on the PSDK of the flight platform. The illegal loads carried by the flight platform may be locked by the manufacturer to prevent the user from controlling the loads through the flight platform. Thus, the illegal load may not complete the task specified by the user.

Figure 3:
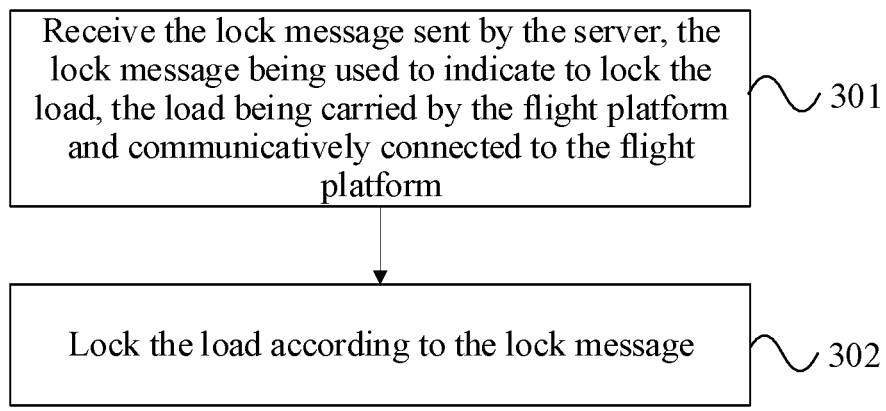
FIG. 3 is a schematic flowchart of the control method according to some other embodiments of the present disclosure.

FIG. 3 is a schematic flowchart of the control method according to some other embodiments of the present disclosure. The method of embodiments of the present disclosure may be executed by the control device. The control device includes the flight platform or the adapter ring carried by the flight platform. As shown in FIG. 3, the method of embodiments of the present disclosure includes the following processes.

At 301, the lock message sent by the server is received. The lock message is used to indicate to lock the load. The load is carried by the flight platform and communicatively connected to the flight platform.

Process 301 corresponds to process 202. For detailed description of the process 301, reference can be made to process 202, which is not repeated here.

At 302, the load is locked according to the lock message.

In some embodiments, the purpose of locking the load is to prevent the user from controlling the load through the flight platform, such that the load cannot complete the task specified by the user. When the user controls the load through the flight platform, the flight platform needs to communicate with the load. Thus, locking the load may include cutting off the communication link of the load. Since the load needs the power source provided by the flight platform and can operate after being powered up. Thus, locking the load may include cutting off the power source. Therefore, locking the load may include cutting off the power source and/or communication link.

The manner of locking the load according to the lock message is not limited by the present disclosure. For example, data that the user needs to send to the load may be modified to invalid data (e.g., 0000 or ffff) first and then sent to the load. As such, the user may not control the load through the flight platform, and the load may not complete the task specified by the user to lock the load.

In some embodiments, the lock message sent by the server may be received, the lock message is used to indicate to lock the load carried by the flight platform. According to the lock message, the load may be locked. The server may lock the load carried by the flight platform through the control device. Thus, the user may not control the load through the flight platform, and the load may not complete the task specified by the user. As such, the user may be prevented from using the load having the safety issue, and the problem of the unsecured safety of the load may be solved.

Figure 4:
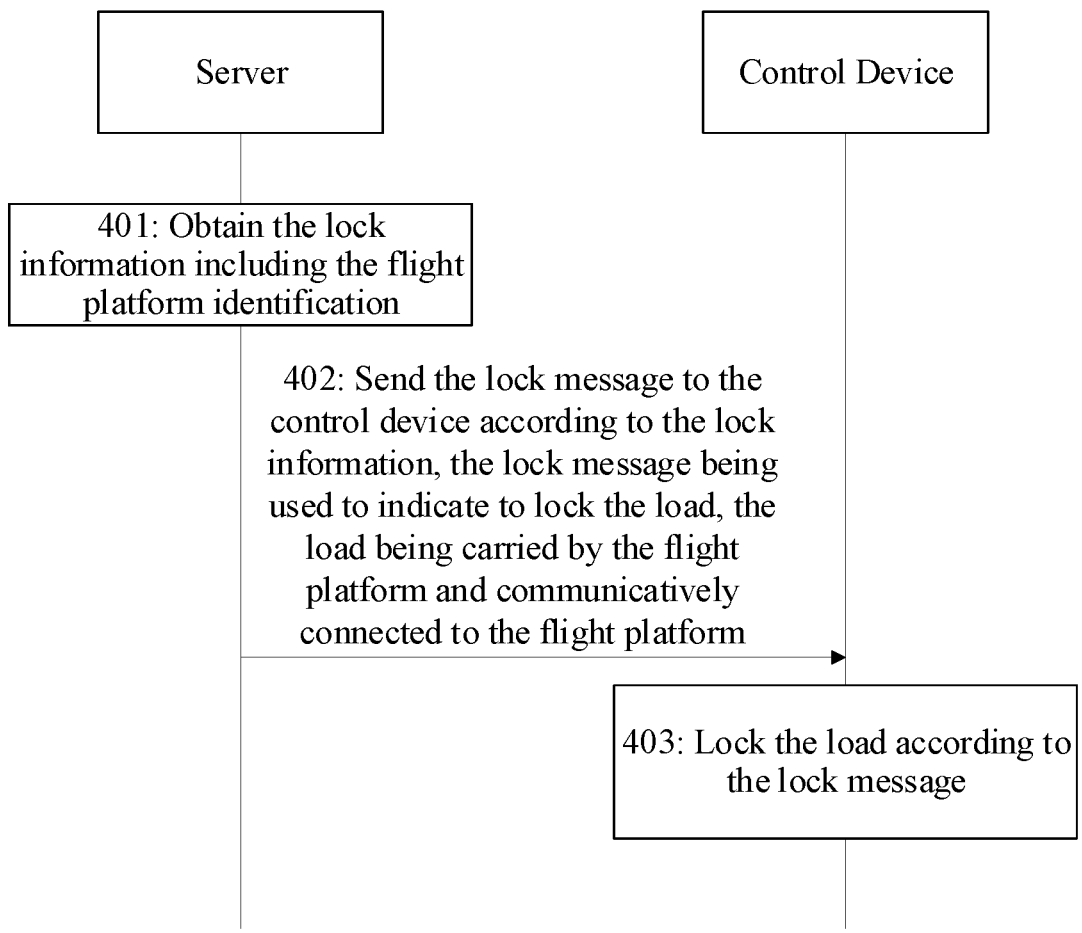
FIG. 4 is a schematic flowchart of the control method according to some other embodiments of the present disclosure.

FIG. 4 is a schematic flowchart of the control method according to some other embodiments of the present disclosure. Based on FIG. 2 and FIG. 3, FIG. 4 describes an interaction between the control device and the server. The method shown in FIG. 4 includes the following processes.

At 401, the server obtains the lock information, which includes the flight platform identification.

In some embodiments, the lock information includes an identification of a target load, which is used to indicate that the target load carried by the specific flight platform corresponding to the flight platform identification needs to be locked. The target load may include all or some of the loads carried by the flight platform, which is not limited by the present disclosure. For example, the target load may include the load developed by the third-party developer of all the loads carried by the flight platform.

In some embodiments, the lock information may further include a danger level, which is used to indicate a dangerous degree of the load carried by the specific flight platform corresponding to the flight platform identification. For example, the higher the dangerous degree is, the more dangerous the load is. In some embodiments, the danger level of the lock information may be used for statistics purposes or may be used by the control device to control the load according to the danger level.

For the manner of obtaining the lock information, reference can be made to process 201, which is not repeated here.

At 402, the server sends the lock message to the control device according to the lock information. The lock message is used to indicate to lock the load. The load is carried by the flight platform and communicatively connected to the flight platform.

In the process, the lock message may be used to indicate to lock the target load, or lock the load according to the danger level, or lock the target load according to the danger level.

In some embodiments, sending the lock message to the control device may include sending the lock message to a user device such that the user device may forward the lock message to the control device. An application (App) of the user device may be used to control the flight platform. In some other embodiments, the lock message may be sent to the user device, which can forward the lock message to a remote controller. Then, the remote controller may forward the lock message to the flight platform. Further, the App of the user device may be offline. When the App is offline, the user device cannot receive the lock message sent by the server. In some other embodiments, to guarantee a success rate of sending the lock message to the control device, before sending the lock message to the user device, the method may include sending a broadcast message used to search for the App, and determining whether a reply message sent by the user device is received in a preset time. The reply message is a response of the user device to the broadcast message. When the reply message sent by the user device is received, the lock message may be further sent to the user device.

Since the control device corresponds to the server. Correspondingly, the control device receiving the lock message sent by the server may include receiving the lock message sent by the user device.

The manner for the user device to forward the lock message to the control device is not limited by the present disclosure. For example, the user device may directly forward the lock message to the control device, or forward the lock message to the control device through an intermediate device.

In some embodiments, sending the lock message to the control device may include sending the lock message to a satellite terminal carried by the flight platform, such that the satellite terminal may forward the lock message to the control device. Optionally, the lock message may be sent to the satellite terminal, and then the satellite terminal may send the lock message in a form of a short message to the flight platform. The satellite terminal may include, for example, a BeiDou satellite terminal. Further, when the lock message is sent to the control device through the satellite terminal, a satellite link needs to be blocked. However, the satellite link is limited, thus, before sending the lock message to the satellite terminal, the method may further include sending the broadcast message used to search for the App of controlling the flight platform, and determining whether the reply message sent by the user device is received in the preset time. The reply message is the response of the user device to the broadcast message. Further, if the reply message sent by the user device is not received in the preset time, the lock message may be sent to the satellite terminal.

Since the control device corresponds to the server. Correspondingly, the control device receiving the lock message sent by the server may include receiving the lock message sent by the satellite terminal.

The manner for the satellite device (e.g., satellite terminal) to forward the lock message to the control device is not limited by the present disclosure. For example, the satellite device may forward the lock message directly to the control device, or forward the lock message to the control device through the intermediate device.

In some embodiments, when the control device is the adaptor ring, and the adapter ring is communicatively connected to the server via the flight platform, the server sending the lock message to the control device may include sending the lock message to the flight platform such that the flight platform may forward the lock message to the control device. Correspondingly, the control device receiving the lock message sent by the server may include receiving the lock message sent by the flight platform.

At 403, the control device locks the load according to the lock message.

In some embodiments, when the lock message is used to indicate to lock the target load, process 403 may include locking the target load according to the lock message. When the lock message is used to indicate to lock the load according to the danger level, process 403 may include determining a locking solution corresponding to the danger level according to the lock message and locking the load according to the locking solution. When the lock message is used to indicate to lock the target load according to the danger level, process 403 may include determining the locking solution corresponding to the danger level according to the lock message and locking the target load according to the locking solution.

In some embodiments, the locking solution includes a cutting-off manner. Different cutting-off manners may represent different degrees of cutting off. The higher the danger level is, the higher the degree of cutting off represented by the corresponding cutting manner is. The cutting-off manner includes cutting off the power source, and/or cutting off the communication link. For example, when the danger level is low, the cutting-off manner may include cutting off the communication link. When the danger level is high, the cutting-off manner may include cutting off the power source. When the danger level is the highest, the cutting-off manner may include cutting off both the power source and the communication link.

In some embodiments, the locking solution further includes an effective time. Different effective times may reflect different degrees of urgency. The higher the danger level is, the higher the degree of the urgency reflected by the corresponding effective time is. The effective time may correspond to delayed effective or immediate effective. For example, when the danger level is low, the effective time may correspond to delayed effective, e.g., delayed by 1 hour. When the danger level is high, the effective time may correspond to delayed effective, e.g., delayed by 5 minutes. When the danger level is the highest, the effective time may correspond to immediate effective.

In some embodiments, the server sends the lock message to the control device according to the lock information. The lock message may be used to indicate to lock the load. The control device may lock the load according to the lock message. Thereby, the server may lock the load carried by the flight platform through the control device. As such, the user may not control the load through the flight platform, and the load may not complete the task specified by the user. Thus, the user may be prevented from using the load having the safety issue, and the problem of the unsecured safety of the load may be solved.

Figure 5:
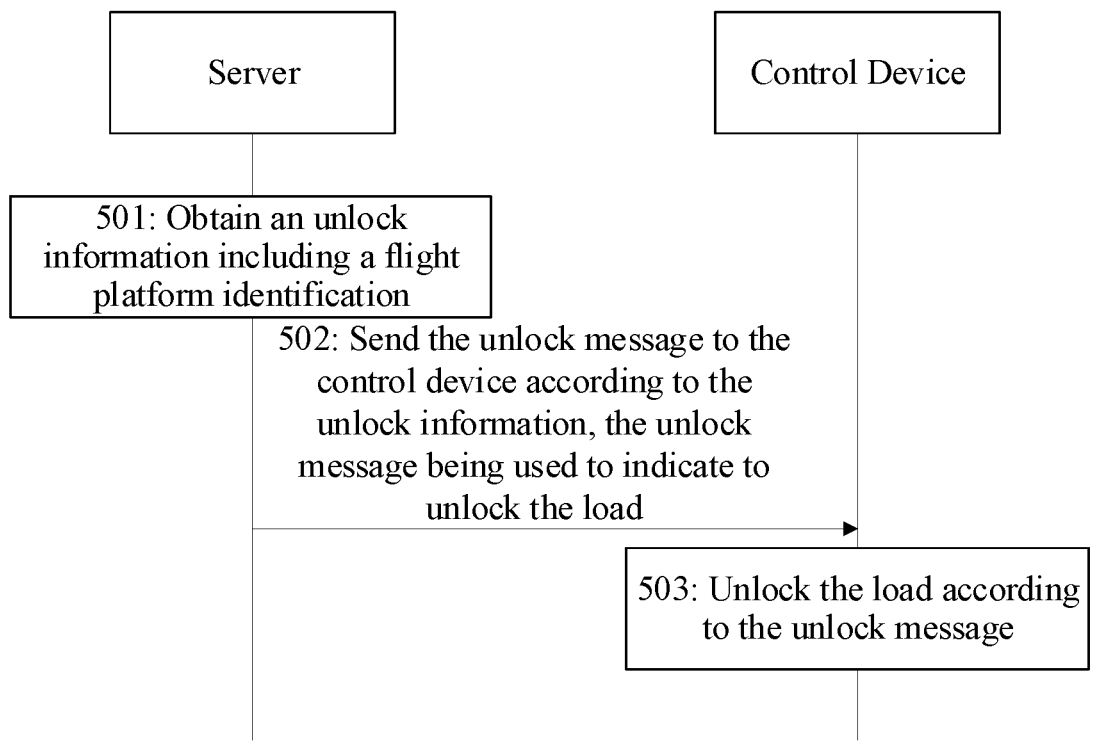
FIG. 5 is a schematic flowchart of the control method according to some other embodiments of the present disclosure.

FIG. 5 is a schematic flowchart of a control method according to some other embodiments of the present disclosure. Based on the above-described embodiments, a method after the load is locked is described. As shown in FIG. 5, the method includes the following processes.

At 501, the server obtains an unlock information, which includes a flight platform identification.

In some embodiments, the unlock information includes the flight platform identification, which is used to indicate that the load carried by a specific flight platform corresponding to the flight platform identification needs to be unlocked. The manner for the server to obtain the unlock information is not limited by the present disclosure. In some embodiments, the server may obtain the unlock information through unlock information entered by the user or obtain the unlock information through a touch operation performed by the user (e.g., when the user selects an unlock button at the control interface of the flight platform, the unlock information may be obtained), or obtain the unlock information by receiving unlock information sent by another device.

The manner of how to determine that the load of the specific flight platform needs to be unlocked is not limited by the present disclosure. For example, the user may submit an unlock application about unlocking a load carried by the flight platform to the server, after an administrator approves the unlock application, a need may be determined to unlock the load carried by the flight platform.

In some embodiments, the unlock information may further include a target load identification, which is used to indicate to unlock the target load carried by the specific flight platform corresponding to the target load identification. The target load may be some or all loads of the locked loads carried by the flight platform, which is not limited by the present disclosure.

At 502, the server sends the unlock message to the control device according to the unlock information. The unlock message is used to indicate to unlock the load.

In the process, the unlock message is used to indicate to unlock the target load. The manner of sending the unlock message to the control device according to the unlock information is not limited by the present disclosure. In some embodiments, the unlock message may be generated according to the unlock information, and the unlock message may be sent to the control device, or the unlock message corresponding to the unlock information may be determined, and the unlock message may be sent to the control device according to the unlock information and correspondences between unlock information and unlock messages. The purpose to unlock the load may include allowing the user to control the load through the flight platform, such that the load may complete the task specified by the user.

The manner for the unlock message to indicate to unlock the load is not limited by the present disclosure. For example, the message name may indicate to unlock the load, or a specific identification (e.g., 0) of the message may indicate to unlock the load.

The manner for the server to send the unlock message to the control device is similar to the manner for the server to send the lock message to the control device, which is not repeated here.

At 503, the load is unlocked according to the unlock message.

In some embodiments, when the unlock message is used to indicate to unlock the target load, the process 503 may include unlocking the target load according to the unlock message. The manner of unlocking the load corresponds to the manner of locking the load. In some embodiments, when locking the load includes cutting off the power source of the load, correspondingly, unlocking the load may include connecting the load to the power source. When locking the load includes cutting off the communication link of the load, correspondingly, unlocking the lock may include connecting the communication link of the load.

In some embodiments, the server may send the unlock message to the control device according to the unlock information. The unlock message may be used to indicate to unlock the load. The control device may unlock the load according to the unlock message. As such, after the load is locked, the server may unlock the load carried by the flight platform through the control device. Thus, the user may control the load through the flight platform to improve control flexibility.

Figure 6:
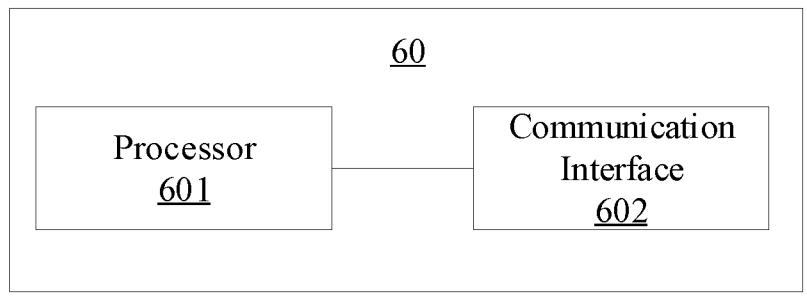
FIG. 6 is a schematic structural diagram of a server according to some embodiments of the present disclosure.

FIG. 6 is a schematic structural diagram of a server 60 according to some embodiments of the present disclosure. As shown in FIG. 6, the server 60 includes a processor 601. The processor 601 is configured to obtain lock information, which includes a flight platform identification. The processor 601 is further configured to send a lock message to a control device according to the lock information. The control device includes a flight platform or an adapter ring carried by the flight platform. The lock message is used to indicate to lock the load. The load is carried by the flight platform and is communicatively connected to the flight platform.

The processor 601 obtaining the lock information may include obtaining the lock information entered by the user, or obtaining a coordinate of the flight platform entered by the user and determining the lock information according to the coordinate of the flight platform, or receiving the lock information sent by another device.

Optionally, the lock information may include a target load identification.

Correspondingly, the lock message may be used to indicate to lock the target load.

Optionally, the lock information may further include a danger level.

Correspondingly, the lock message may be used to indicate to lock the load according to the danger level.

Optionally, the processor 601 sending the lock message to the control device may include sending the lock message to the user device such that the user device may forward the lock message to the control device. An App of the user device is used to control the flight platform.

Optionally, the processor 601 may be further configured to send a broadcast message used to search for the App and receive a reply message sent by the user device. The reply message is a response of the user device to the broadcast message.

Optionally, the processor 601 sending the lock message to the control device may include sending the lock message to a satellite terminal carried by the flight platform, such that the satellite terminal may forward the lock message to the control device.

Optionally, processor 601 sending the lock message to the satellite terminal may include sending the broadcast message used to search for the App of controlling the flight platform, and if the reply message sent by the user device is not received in a preset time, sending the lock message to the satellite terminal. The reply message may be the response of the user device to the broadcast message.

Optionally, the processor 601 may be further configured to obtain unlock information including the flight platform identification, and send an unlock message to the control device according to the unlock information. The unlock message may be used to indicate to unlock the load.

Optionally, the unlock information may further include a target load identification. The unlock message may be further used to indicate to unlock the target load.

Optionally, the server 60 further includes a communication interface 602. The processor 601 sending or receiving a message may include sending or receiving the message by controlling the communication interface 602. For example, the processor 601 sending the lock message to the control device according to the lock information may include controlling the communication interface 602 to send the lock message to the control device according to the lock information.

The server provided by embodiments of the present disclosure may be configured to execute the technical solution on the server side of the above-described method embodiments. The implementation principle and technical effect are similar to those of the method embodiments, which are not repeated here.

Figure 7:
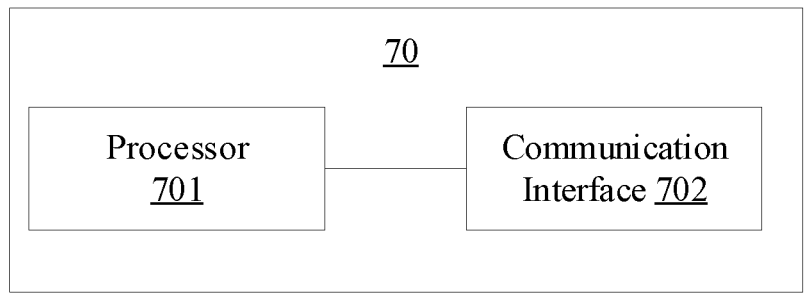
FIG. 7 is a schematic structural diagram of a control device according to some embodiments of the present disclosure.

FIG. 7 is a schematic structural diagram of a control device 70 according to some embodiments of the present disclosure. The control device 70 provided by embodiments of the present disclosure may include a flight platform or an adapter ring carried by the flight platform. As shown in FIG. 7, the control device 70 includes a processor 701. The processor 701 may be configured to receive a lock message sent by the server. The lock message may be used to indicate to lock the load. The load is carried by the flight platform and communicatively connected to the flight platform. The processor 701 may be further configured to lock the load according to the lock message.

Optionally, the lock message may be used to indicate to lock a target load.

Locking the load according to the lock message may include locking the target load according to the lock message.

Optionally, the lock message may be further used to indicate to lock the load according to a danger level.

The processor 701 locking the load according to the lock message may include determining a lock solution corresponding to the danger level according to the lock message and lock the load according to the lock solution.

Optionally, the locking solution may include a cutting-off manner.

Optionally, the cutting-off manner may include cutting off a power source, and/or cutting off a communication link.

Optionally, the locking solution may further include an effective time.

Optionally, the effective time may correspond to delayed effective or immediate effective.

Optionally, receiving the lock message sent by the server may include receiving the lock message sent by the user device, the lock message being sent to the user device by the server, and the App of the user device being used to control the flight platform, or receiving the lock message sent by the satellite terminal, the lock message being sent to the satellite terminal by the server, and the satellite terminal being carried by the flight platform.

The processor 701 may be further configured to receive an unlock message sent by the server. The unlock message may be used to indicate to unlock the load, and unlock the load according to the unlock message.

Optionally, the unlock message may be used to indicate to unlock the target load.

Unlocking the load according to the unlock message may include unlocking the target load according to the unlock message.

Optionally, the control device may include an adapter ring.

Receiving the lock message sent by the server may include receiving the lock message sent by the flight platform, the lock message being sent to the flight platform by the server.

Optionally, the control device 70 further includes a communication interface 702. The processor 701 sending or receiving a message may include sending or receiving the message by controlling the communication interface 702. For example, the processor 701 receiving the lock message sent by the server may include controlling the communication interface 702 to receive the lock message sent by the server.

The control device provided by embodiments of the present disclosure may be configured to execute the technical solution on the control device side of the above-described method embodiments. The implementation principle and technical effect are similar to those of method embodiments, which are not repeated here.

Embodiments of the present disclosure provide a control system including the server shown in FIG. 6 and the control device shown in FIG. 7.

Those of ordinary skill in the art can understand that all or some of the processes in the above-described method embodiments can be implemented by a program instructing relevant hardware. The program can be stored in a computer-readable storage medium. When the program is executed, the processes including the above-described method embodiments are executed. The storage medium includes a medium that can store program codes, such as read-only memory (ROM), random access memory (RAM), magnetic disk, optical disk, etc.

The above embodiments are only used to illustrate the technical solutions of the present disclosure, not to limit them. Although the present disclosure has been described in detail with reference to the above embodiments, those of ordinary skill in the art should understand that modifications may be made to the technical solutions recorded in the above embodiments, or equivalent replacements may still be made to some or all technical features. These modifications and replacements do not make the essence of the corresponding technical solutions depart from the scope of the technical solutions of the present disclosure.

What is claimed is:

1. A control method comprising:
obtaining lock information including a flight platform identification of a flight platform, the flight platform being communicatively connected to a load and configured to carry the load to fly; and
sending a lock message to a control device according to the lock information, the control device including the flight platform or an adapter ring carried by the flight platform, wherein the load is configured to be locked according to the lock message, and when being locked, the load is uncontrolled by the flight platform that carries the load to fly.

2. The method of claim 1, wherein obtaining the lock information includes at least one of:
obtaining the lock information entered by a user;
obtaining a coordinate of the flight platform entered by the user and determining the lock information according to the coordinate of the flight platform; or
receiving the lock information sent by another device.

3. The method of claim 1, wherein:
the lock information further includes a target load identification; and
the lock message indicates to lock a target load corresponding to the target load identification.

4. The method of claim 1, wherein:
the lock information further includes a danger level; and
the lock message indicates to lock the load according to the danger level.

5. The method of claim 1, wherein sending the lock information to the control device includes:
sending the lock message to a user device, such that the user device forwards the lock message to the control device, an application (App) of the user device being configured to control the flight platform.

6. The method of claim 5, further comprising, before sending the lock message to the user device:
sending a broadcast message to search for the App; and
receiving a reply message sent by the user device, the reply message being a response of the user device to the broadcast message.

7. The method of claim 1, wherein sending the lock message to the control device includes:
sending the lock message to a satellite terminal carried by the flight platform to cause the satellite terminal to forward the lock message to the control device.

8. The method of claim 7, wherein sending the lock message to the satellite terminal includes:
sending a broadcast message to search for an App that controls the flight platform; and
in response to not receiving a reply message sent by a user device in a preset time, sending the lock message to the satellite terminal, the reply message being a response of the user device to the broadcast message.

9. The method of claim 1, further comprising, after sending the lock message to the control device according to the lock information:
obtaining unlock information including the flight platform identification; and
sending an unlock message to the control device according to the lock information, the unlock message indicating to unlock the load.

10. The method of claim 9, wherein the unlock information includes a target load identification, and the unlock message indicates to unlock a target load corresponding to the target load identification.

11. The method of claim 1, wherein the locking message instructs to lock the load by one of:
modifying data that a user needs to send to the load to invalid data and sending the invalid data to the load;
cutting off a communication link to the load; or
cutting off a power source to the load.

12. A control method comprising:
receiving a lock message sent by a server, the lock information indicating to lock a load communicatively connected to a flight platform, and the flight platform being configured to carry the load to fly; and
locking the load according to the lock message, wherein when being locked, the load is uncontrolled by the flight platform that carries the load to fly.

13. The method of claim 12, wherein:
the lock message indicates to lock a target load; and
locking the load according to the lock message includes locking the target load according to the lock message.

14. The method of claim 12, wherein:
the lock message indicates to lock the load according to a danger level; and
locking the load according to the lock message includes determining a lock solution corresponding to the danger level according to the lock message and lock the load according to the lock solution.

15. The method of claim 14, wherein the lock solution includes a cutting-off manner.

16. The method of claim 15, wherein the cutting-off manner includes cutting off at least one of a power source or a communication link.

17. The method of claim 15, wherein the lock solution further includes an effective time.

18. The method of claim 17, wherein the effective time indicates delayed effective or immediate effective.

19. The method of claim 12, wherein receiving the lock message sent by the server includes:
receiving the lock message sent by a user device, the lock message being sent to the user device by the server, and an App of the user device being configured to control the flight platform; or
receiving the lock message sent by a satellite terminal, the lock message being sent to the satellite terminal by the server, and the satellite terminal being carried by the flight platform.

20. The method of claim 12, further comprising, after locking the load according to the lock message:
receiving an unlock message sent by the server, the unlock message indicating to unlock the load; and
unlock the load according to the unlock message.

21. The method of claim 20, wherein:
the unlock message indicates to unlock a target load; and
unlocking the load according to the unlock message includes unlocking the target load according to the unlock message.

22. A server comprising:
a processor configured to:
obtain lock information including a flight platform identification of a flight platform, the flight platform being communicatively connected to a load and configured to carry the load to fly; and
send the lock message to a control device according to the lock information, the control device including the flight platform or an adapter ring carried by the flight platform, wherein the load is configured to be locked according to the lock message, and when being locked, the load is uncontrolled by the flight platform that carries the load to fly.

* * * * *